United States Patent
Barbu et al.

(10) Patent No.: US 12,309,740 B2
(45) Date of Patent: May 20, 2025

(54) HANDOVER OF SIDELINK POSITIONING SESSION

(71) Applicant: Nokia Technologies Oy, Espoo (FI)

(72) Inventors: Oana-Elena Barbu, Aalborg (DK); Nuno Manuel Kiilerich Pratas, Gistrup (DK); Prajwal Keshavamurthy, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/850,211

(22) PCT Filed: Mar. 29, 2022

(86) PCT No.: PCT/EP2022/058204
§ 371 (c)(1),
(2) Date: Sep. 24, 2024

(87) PCT Pub. No.: WO2023/186265
PCT Pub. Date: Oct. 5, 2023

(65) Prior Publication Data
US 2025/0113329 A1    Apr. 3, 2025

(51) Int. Cl.
*H04W 64/00* (2009.01)
*H04W 36/00* (2009.01)

(52) U.S. Cl.
CPC ..... *H04W 64/003* (2013.01); *H04W 36/0055* (2013.01)

(58) Field of Classification Search
CPC . H04W 16/28; H04W 24/10; H04W 28/0221; H04W 52/0229; H04W 52/0245;
(Continued)

(56) References Cited

U.S. PATENT DOCUMENTS

| 2021/0105817 A1* | 4/2021 | Nguyen | H04W 74/0816 |
| 2021/0235340 A1* | 7/2021 | Moosavi | H04W 36/0094 |

(Continued)

FOREIGN PATENT DOCUMENTS

| EP | 3516911 B1 | 5/2021 |
| WO | 2021030583 A1 | 2/2021 |

OTHER PUBLICATIONS

International Search Report issued by the European Patent Office acting as the International Searching Authority in relation to International Application No. PCT/EP2022/058204 dated Oct. 28, 2022 (3 pages).

(Continued)

*Primary Examiner* — Joseph Arevalo
(74) *Attorney, Agent, or Firm* — Robert P. Michal, Esq.; Carter, DeLuca & Farrell LLP

(57) ABSTRACT

A method including transmitting, by a third user device, to one or more second user devices, a request message for requesting a handover of a sidelink positioning session established between the third user device and a first user device; receiving, by the third user device, from the one or more second user devices, one or more response messages to the request message; selecting, by the third user device, at least one second user device of the one or more second user devices; and transmitting, by the third user device, to the at least one second user device, at least one configuration for performing one or more handovers of the sidelink positioning session from the third user device to the at least one second user device for the first user device.

1 Claim, 6 Drawing Sheets

(58) Field of Classification Search
CPC ......... H04W 52/0251; H04W 52/0274; H04W 52/028
USPC ......... 455/456.1, 522, 431, 509, 436, 404.1, 455/41.2, 418, 423
See application file for complete search history.

(56) References Cited

U.S. PATENT DOCUMENTS

| | | | |
|---|---|---|---|
| 2021/0314830 A1* | 10/2021 | Chang | H04W 36/0072 |
| 2022/0015001 A1* | 1/2022 | Parichehrehteroujeni | H04W 36/00837 |
| 2022/0022121 A1* | 1/2022 | Eklöf | H04W 36/087 |
| 2023/0109947 A1* | 4/2023 | Parkvall | H04W 52/0245 455/418 |
| 2024/0064592 A1* | 2/2024 | Falkenberg | H04W 4/46 |

OTHER PUBLICATIONS

Written Opinion of the International Searching Authority issued by the European Patent Office acting as the International Searching Authority in relation to International Application No. PCT/EP2022/058204 dated Oct. 28, 2022 (7 pages).

\* cited by examiner

HANDOVER OF SIDELINK POSITIONING SESSION

CROSS-REFERENCE TO RELATED APPLICATIONS

This application is a national phase entry under 35 U.S.C. 371 of PCT International Application No. PCT/EP2022/058204 filed Mar. 29, 2022, the disclosure of this application is expressly incorporated herein by reference in its entirety.

FIELD

The following example embodiments relate to wireless communication and to positioning.

BACKGROUND

Positioning technologies may be used to estimate a physical location of a device. It is desirable to mitigate interruptions of a positioning session.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory including computer program code, wherein the at least one memory and the computer program code are configured, with the at least one processor, to cause the apparatus to: transmit, to one or more second user devices, a request message for requesting a handover of a sidelink positioning session established between the apparatus and a first user device; receive, from the one or more second user devices, one or more response messages to the request message; select at least one second user device of the one or more second user devices; and transmit, to the at least one second user device, at least one configuration for performing one or more handovers of the sidelink positioning session from the apparatus to the at least one second user device for the first user device.

According to another aspect, there is provided an apparatus comprising means for: transmitting, to one or more second user devices, a request message for requesting a handover of a sidelink positioning session established between the apparatus and a first user device; receiving, from the one or more second user devices, one or more response messages to the request message; selecting at least one second user device of the one or more second user devices; and transmitting, to the at least one second user device, at least one configuration for performing one or more handovers of the sidelink positioning session from the apparatus to the at least one second user device for the first user device.

According to another aspect, there is provided a method comprising: transmitting, by a third user device, to one or more second user devices, a request message for requesting a handover of a sidelink positioning session established between the third user device and a first user device; receiving, by the third user device, from the one or more second user devices, one or more response messages to the request message; selecting, by the third user device, at least one second user device of the one or more second user devices; and transmitting, by the third user device, to the at least one second user device, at least one configuration for performing one or more handovers of the sidelink positioning session from the third user device to the at least one second user device for the first user device.

According to another aspect, there is provided a computer program comprising instructions which, when executed by an apparatus, cause the apparatus to perform at least the following: transmitting, to one or more second user devices, a request message for requesting a handover of a sidelink positioning session established between the apparatus and a first user device; receiving, from the one or more second user devices, one or more response messages to the request message; selecting at least one second user device of the one or more second user devices; and transmitting, to the at least one second user device, at least one configuration for performing one or more handovers of the sidelink positioning session from the apparatus to the at least one second user device for the first user device.

According to another aspect, there is provided a computer program comprising instructions for causing an apparatus to perform at least the following: transmitting, to one or more second user devices, a request message for requesting a handover of a sidelink positioning session established between the apparatus and a first user device; receiving, from the one or more second user devices, one or more response messages to the request message; selecting at least one second user device of the one or more second user devices; and transmitting, to the at least one second user device, at least one configuration for performing one or more handovers of the sidelink positioning session from the apparatus to the at least one second user device for the first user device.

According to another aspect, there is provided a computer readable medium comprising program instructions for causing an apparatus to perform at least the following: transmitting, to one or more second user devices, a request message for requesting a handover of a sidelink positioning session established between the apparatus and a first user device; receiving, from the one or more second user devices, one or more response messages to the request message; selecting at least one second user device of the one or more second user devices; and transmitting, to the at least one second user device, at least one configuration for performing one or more handovers of the sidelink positioning session from the apparatus to the at least one second user device for the first user device.

According to another aspect, there is provided a non-transitory computer readable medium comprising program instructions for causing an apparatus to perform at least the following: transmitting, to one or more second user devices, a request message for requesting a handover of a sidelink positioning session established between the apparatus and a first user device; receiving, from the one or more second user devices, one or more response messages to the request message; selecting at least one second user device of the one or more second user devices; and transmitting, to the at least one second user device, at least one configuration for performing one or more handovers of the sidelink positioning session from the apparatus to the at least one second user device for the first user device.

According to another aspect, there is provided an apparatus comprising at least one processor, and at least one memory including computer program code, wherein the at least one memory and the computer program code are configured, with the at least one processor, to cause the apparatus to: receive, from a third user device, a request message for requesting a handover of a sidelink positioning session established between the third user device and a first user device; transmit, to the third user device, a response message to the request message; and receive, from the third user device, in response to transmitting the response message, at least one configuration for performing the handover of the sidelink positioning session from the third user device to the apparatus for the first user device.

According to another aspect, there is provided an apparatus comprising means for: receiving, from a third user device, a request message for requesting a handover of a sidelink positioning session established between the third user device and a first user device; transmitting, to the third user device, a response message to the request message; and receiving, from the third user device, in response to transmitting the response message, at least one configuration for performing the handover of the sidelink positioning session from the third user device to the apparatus for the first user device.

According to another aspect, there is provided a method comprising: receiving, by a second user device, from a third user device, a request message for requesting a handover of a sidelink positioning session established between the third user device and a first user device; transmitting, by the second user device, to the third user device, a response message to the request message; and receiving, by the second user device, from the third user device, in response to transmitting the response message, at least one configuration for performing the handover of the sidelink positioning session from the third user device to the second user device for the first user device.

According to another aspect, there is provided a computer program comprising instructions which, when run on an apparatus, cause the apparatus to perform at least the following: receiving, from a third user device, a request message for requesting a handover of a sidelink positioning session established between the third user device and a first user device; transmitting, to the third user device, a response message to the request message; and receiving, from the third user device, in response to transmitting the response message, at least one configuration for performing the handover of the sidelink positioning session from the third user device to the apparatus for the first user device.

According to another aspect, there is provided a computer program comprising instructions for causing an apparatus to perform at least the following: receiving, from a third user device, a request message for requesting a handover of a sidelink positioning session established between the third user device and a first user device; transmitting, to the third user device, a response message to the request message; and receiving, from the third user device, in response to transmitting the response message, at least one configuration for performing the handover of the sidelink positioning session from the third user device to the apparatus for the first user device.

According to another aspect, there is provided a computer readable medium comprising program instructions for causing an apparatus to perform at least the following: receiving, from a third user device, a request message for requesting a handover of a sidelink positioning session established between the third user device and a first user device; transmitting, to the third user device, a response message to the request message; and receiving, from the third user device, in response to transmitting the response message, at least one configuration for performing the handover of the sidelink positioning session from the third user device to the apparatus for the first user device.

According to another aspect, there is provided a non-transitory computer readable medium comprising program instructions for causing an apparatus to perform at least the following: receiving, from a third user device, a request message for requesting a handover of a sidelink positioning session established between the third user device and a first user device; transmitting, to the third user device, a response message to the request message; and receiving, from the third user device, in response to transmitting the response message, at least one configuration for performing the handover of the sidelink positioning session from the third user device to the apparatus for the first user device.

According to another aspect, there is provided a system comprising a first user device, at least one second user device, and a third user device. The third user device is configured to: transmit, to one or more second user devices, a request message for requesting a handover of a sidelink positioning session established between the third user device and the first user device; receive, from the one or more second user devices, a response message to the request message; select the at least one second user device of the one or more second user devices; and transmit, to the at least one second user device, at least one configuration for performing one or more handovers of the sidelink positioning session from the third user device to the at least one second user device for the first user device. The at least one second user device is configured to: receive the request message from the third user device; transmit, to the third user device, the response message to the request message; and receive, from the third user device, in response to transmitting the response message, the at least one configuration for performing the one or more handovers of the sidelink positioning session from the third user device to the at least one second user device for the first user device.

According to another aspect, there is provided a system comprising a first user device, at least one second user device, and a third user device. The third user device comprises means for: transmitting, to one or more second user devices, a request message for requesting a handover of a sidelink positioning session established between the third user device and the first user device; receiving, from the one or more second user devices, a response message to the request message; selecting the at least one second user device of the one or more second user devices; and transmitting, to the at least one second user device, at least one configuration for performing one or more handovers of the sidelink positioning session from the third user device to the at least one second user device for the first user device. The at least one second user device comprises means for: receiving the request message from the third user device; transmitting, to the third user device, the response message to the request message; and receiving, from the third user device, in response to transmitting the response message, the at least one configuration for performing the one or more handovers of the sidelink positioning session from the third user device to the at least one second user device for the first user device.

LIST OF DRAWINGS

In the following, various example embodiments will be described in greater detail with reference to the accompanying drawings, in which FIG. 1 illustrates an example embodiment of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
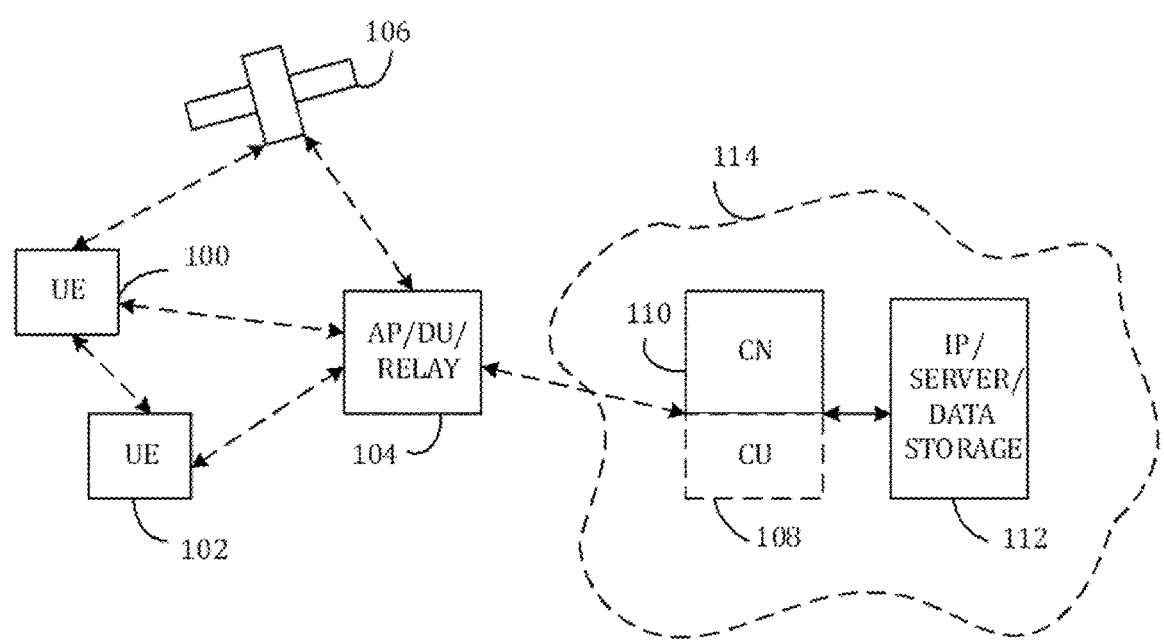

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows one or more user devices 100, 102 configured to be in a wireless connection on one or more communication channels in a radio cell with an access node 104, such as an evolved Node B (abbreviated as eNB or eNodeB) or a next generation Node B (abbreviated as gNB or gNodeB), providing the radio cell. The physical link from a user device to an access node may be called uplink or reverse link, and the physical link from the access node to the user device may be called downlink or forward link. A user device may also communicate directly with another user device via sidelink communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the system, the counterpart on the CN side may be a serving gateway (S-GW, routing and forwarding user data packets), packet data network gateway (P-GW) for providing connectivity of user devices to external packet data networks, user plane function (UPF), mobility management entity (MME), access and mobility management function (AMF), or location management function (LMF), etc.

The user device illustrates one type of an apparatus to which resources on the air interface may be allocated and assigned, and thus any feature described herein with a user device may be implemented with a corresponding apparatus, such as a relay node. The user device may also be called a subscriber unit, mobile station, remote terminal, access terminal, user terminal, terminal device, or user equipment (UE) just to mention but a few names or apparatuses.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device(s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud. The user device (or in some example embodiments a layer 3 relay node) may be configured to perform one or more of user equipment functionalities. The user device may also comprise, or be comprised in, a robot or a vehicle such as a train or a car.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). At least one satellite 106 in the mega-constellation may cover several satellite-enabled network entities that create on-ground cells. The on-ground cells may be created through an on-ground relay node 104 or by a gNB located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have an access to a plurality of radio cells and the system may also comprise other apparatuses, such as physical layer relay nodes or other network elements, etc. At least one of the access nodes may be a Home eNodeB or a Home gNodeB.

Furthermore, the access node may also be split into: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the access node. The DU may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned access node units, or different core network operations and access node operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Positioning techniques may be used to estimate a physical location of a device such as a UE. For example, the following positioning techniques have been specified in NR Rel-16: downlink time difference of arrival (DL-TDoA), uplink time difference of arrival (UL-TDoA), downlink angle of departure (DL-AoD), uplink angle of arrival (UL-AoA), and multi-cell round trip time (multi-RTT). Both RAT-dependent as well as RAT-independent NR positioning techniques may be used. RAT is an abbreviation for radio access technology.

NR Rel-16 introduced UE-based positioning for downlink techniques (e.g., DL-TDoA), which means that the UE makes both the positioning measurements and the location estimate locally. In the UE-based mode, the location of the gNB(s) may be sent to the UE for use in the location estimation process.

The positioning reference signal (PRS) and/or sounding reference signal (SRS) may be used as reference signals for estimating the location of the UE. PRS is a reference signal for positioning in the downlink (DL). SRS is a reference signal that may be used for positioning in the uplink (UL). It should be noted that SRS may also be used for other purposes than positioning. In an NR system, there may be two types of SRS and those SRS may be separately configured to a UE from a gNB. One is SRS for MIMO introduced in NR Rel-15 and another one is SRS for positioning purpose, which has been introduced in NR Rel-16, where SRS for MIMO can also be used for positioning.

For NR Rel-17, there is a target to specify methods, measurements, signaling, and procedures for improving the positioning accuracy of the NR Rel-16 positioning techniques by mitigating UE Rx/Tx and/or gNB Rx/Tx timing delays, including DL-based, UL-based, and DL+UL-based positioning techniques, as well as UE-based and UE-assisted positioning solutions.

For NR Rel-17, there is also a target to specify the procedure, measurements, reporting, and signaling for improving the accuracy of UL-AoA for network-based positioning solutions, as well as DL-AoD for UE-based and network-based (including UE-assisted) positioning solutions.

For NR Rel-17, there is also a target to specify methods, measurements, signaling and procedures to support positioning for UEs in RRC_INACTIVE state, for UE-based and UE-assisted positioning solutions, including DL NR positioning techniques and RAT-independent positioning techniques. This may involve support of UE positioning measurements for UEs in RRC_INACTIVE state, and reporting of positioning measurement or location estimate performed in RRC_INACTIVE when the UE is in RRC_INACTIVE state.

For NR Rel-17, there is also a target to define extensions of signaling, protocol and procedure for NR positioning enhancement.

In NR Rel-18, there is a target to provide expanded and improved positioning with the following example areas: sidelink positioning/ranging, improved accuracy, integrity and power efficiency, as well as reduced capability (RedCap) positioning. The following are identified in terms of requirements: ranging, low-power positioning, accuracy enhancements (e.g., down to centimeter-level), RAT-dependent positioning integrity, and latency reduction.

For ranging, the most identified technique may be sidelink-based.

Low-power positioning may be targeted for example at RedCap devices, but may also be applicable to other devices. This may include support for positioning in RRC_IDLE mode as well as RRC_INACTIVE mode.

The main techniques proposed for accuracy enhancement (apart from sidelink assistance) may be terrestrial carrier-phase positioning, PRS/SRS bandwidth aggregation, and the use of wide bandwidths for example at 60 GHz (which also implies the ability to transmit PRS in unlicensed spectrum, which may be relevant for sidelink positioning).

The proposed objectives in NR Rel-18 are to provide sidelink-based and sidelink-assisted positioning, low-power positioning (including for RedCap devices, including positioning in RRC_IDLE as well as RRC_INACTIVE mode), enhanced accuracy (carrier-phase positioning and PRS/SRS bandwidth aggregation), PRS transmission in unlicensed spectrum (including 60 GHz), and mobile termination (MT) triggered small data transmission (SDT) (at least for network-initiated positioning use case).

In sidelink positioning, a target UE may be positioned by transmitting one or more sidelink positioning reference signals (S-PRS) to one or more anchor UEs, and/or by receiving one or more S-PRSs from the one or more anchor UEs. Herein the term "anchor" may refer to a positioning anchor. The target UE refers to a UE that needs to be localized (positioned).

Figure 2:
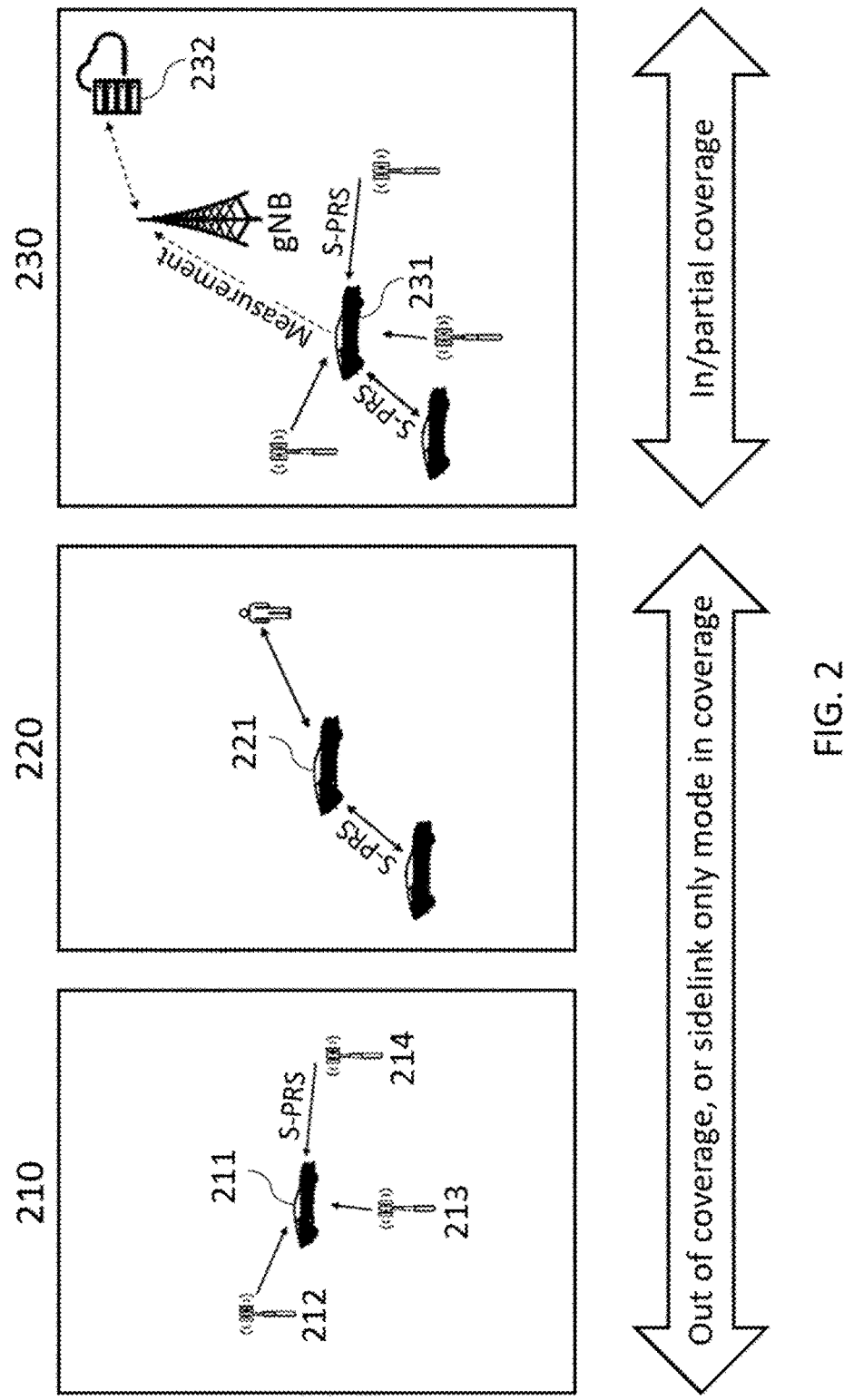
FIG. 2 illustrates examples of sidelink positioning use cases.

FIG. 2 illustrates examples of sidelink positioning use cases. Sidelink positioning may support at least the following use cases: sidelink absolute 210, sidelink relative 220, and sidelink assisted 230.

In sidelink absolute 210, the position of a target UE 211 (e.g., a vehicle) is based on the anchor devices 212, 213, 214 such as road-side units (RSU), wherein the absolute location (longitude and latitude) of the anchor devices is known.

In sidelink relative 220, the distance and angle are calculated by the target UE 221 via the exchange of sidelink positioning reference signals (S-PRS), and the relative location is known.

In sidelink assisted 230, the position of a target UE 231 is calculated by a location server (LCS) 232, and the absolute location (longitude and latitude) is known.

In NR Rel-16 and beyond, NR sidelink (SL) enables a UE to communicate directly with one or more other nearby UEs via sidelink communication. Two resource allocation modes have been specified for SL, and an SL transmitter (Tx) UE may be configured with one of them to perform its sidelink transmission(s). These modes are denoted as NR SL mode 1 and NR SL mode 2. In NR SL mode 1, a sidelink transmission resource is assigned by the network to the SL Tx UE, whereas an SL Tx UE in NR SL mode 2 autonomously selects its SL transmission resources.

Figure 3A:
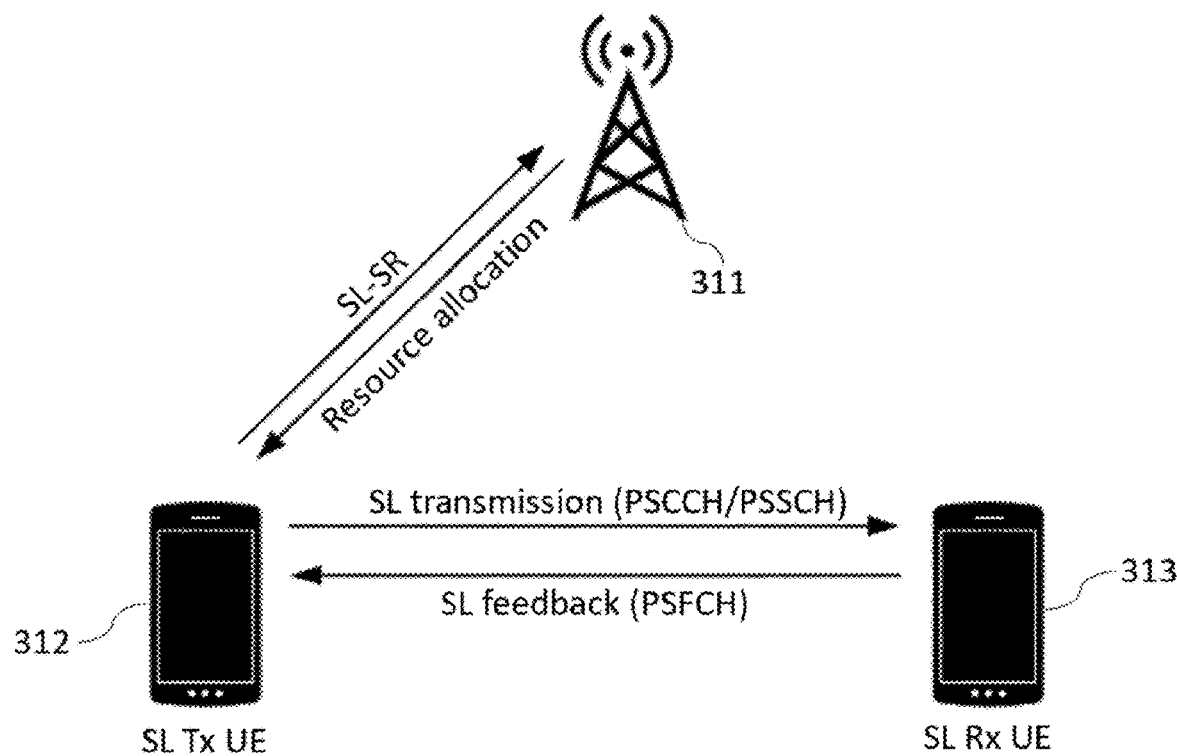
FIGS. 3a and 3b illustrate sidelink modes.

FIG. 3a illustrates NR SL mode 1. In NR SL mode 1, where the gNB 311 is responsible for the SL resource allocation for the SL UEs 312, 313, the configuration and operation is similar to the one over the Uu interface. Referring to FIG. 3a, an SL Tx UE 312 transmits a sidelink scheduling request (SL-SR) to the gNB 312. The gNB 311 indicates an SL resource allocation for the SL Tx UE 312 in response to the SL-SR. Upon receiving the SL resource allocation, the SL Tx UE 312 transmits an SL transmission to the SL Rx UE 313 based on the SL resource allocation via a physical sidelink control channel (PSCCH) or a physical sidelink shared channel (PSSCH). In response to the SL transmission, the SL Rx UE 313 transmits an SL feedback transmission to the SL Tx UE 312 via a physical sidelink feedback channel (PSFCH)

Figure 3B:
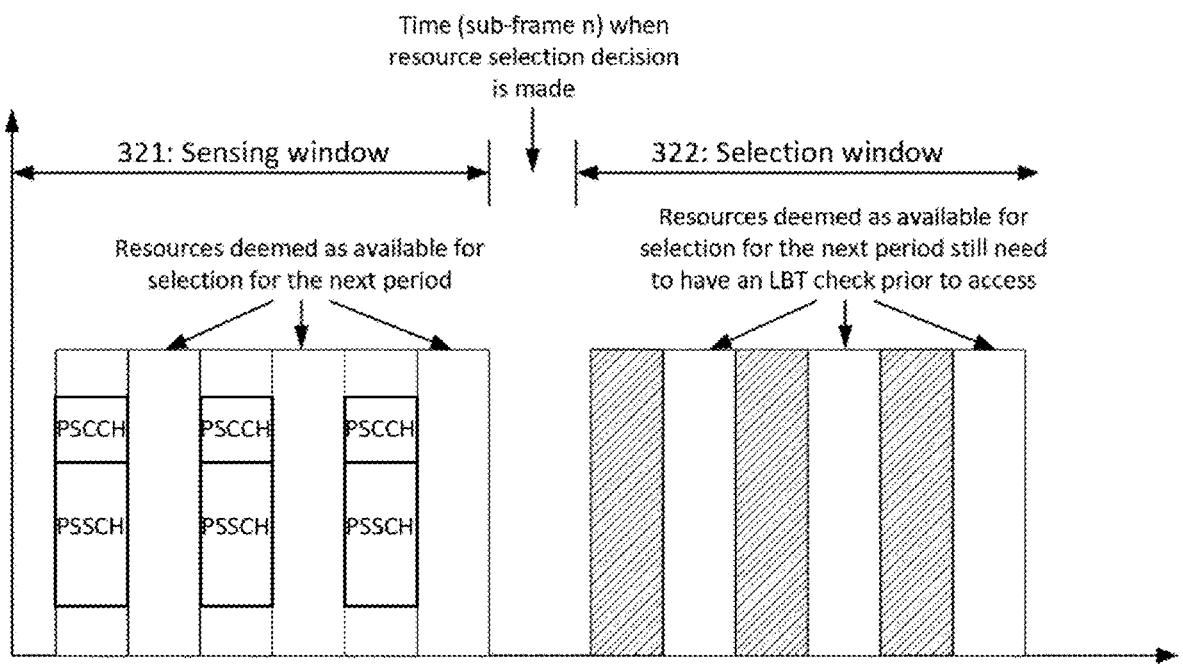

FIG. 3b illustrates NR SL mode 2. In NR SL mode 2, the SL UEs autonomously perform the resource selection with the aid of a sensing procedure. More specifically, an SL Tx UE in NR SL mode 2 first performs a sensing procedure over the configured SL transmission resource pool(s) during a sensing time window 321, in order to obtain knowledge of the resource(s) reserved by other nearby SL Tx UE(s). Based on the knowledge obtained from the sensing, the SL Tx UE may select resource(s) from the available SL resources accordingly during a selection time window 322. Resources deemed as available for selection for the next period may still need to have a listen-before-talk (LBT) check prior to access. In order for an SL UE to perform sensing and obtain the necessary information to receive a SL transmission, it needs to decode the sidelink control information (SCI). In NR Rel-16, the SCI associated with a data transmission includes a 1st stage SCI and a 2nd stage SCI.

SL resource allocation enhancement for NR SL mode 2 has been identified as one of the objectives, in which inter-UE coordination will be studied for enhanced reliability and reduced latency.

Figure 4:
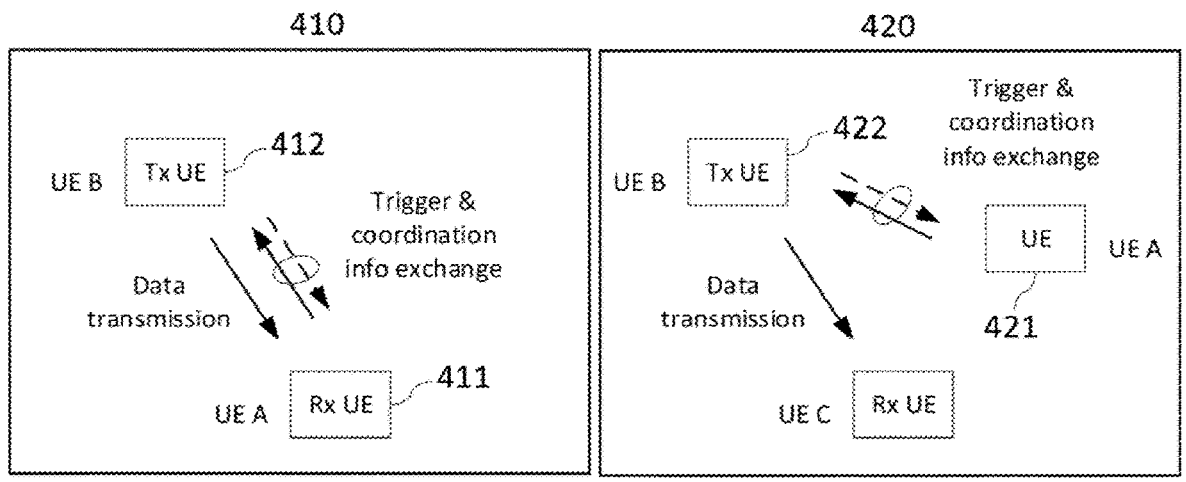
FIG. 4 illustrates coordination between user devices.

FIG. 4 illustrates inter-UE coordination scenarios. In a first inter-UE coordination scenario illustrated in block 410, the coordinating UE 411 (denoted as UE-A) is also the intended receiver of another UE's 412 (denoted as UE-B) transmission. UE-A 411 (Rx UE) selects the preferred SL transmit resource(s) (e.g., according to its sensing) and recommends the selected resource(s) to UE-B 412 (Tx UE). UE-B 412 selects its SL transmit resource by taking into account the resource(s) indicated by UE-A, and performs its own sensing in addition to that. For example, UE-B 412 may use or may not use the recommended resource(s) to transmit to UE-A 411. Thus, by using the inter-UE coordination scheme, UE-A 411 may try to ensure that there is no packet collision or strong interference over its selected resource(s), and thus the transmission from UE-B 412 to UE-A 411 may occur with higher reliability.

In a second inter-UE coordination scenario illustrated in block 420, the coordinating UE 421 (UE-A) is not the intended receiver of UE-B's 422 transmission. UE-A 421 monitors the transmissions taking place in the SL resource pool, and whenever a collision or half-duplex problem is detected (either in the past or in future resources), UE-A informs the impacted UEs.

In SL positioning, the target UE establishes a sidelink positioning session with multiple anchor UEs in order to determine its absolute or relative location. From the perspective of the target UE, the sidelink positioning session may refer to the sidelink signal exchanges between the target UE and other peer UEs to enable the target UE to determine its absolute or relative location. The configuration of the sidelink positioning session may comprise a series of handshakes between the target UE and the anchor UEs in order to establish which entities are involved, as well as what type of signaling and what type of reports are needed to finalize the session. For the target UE, this may be burdensome in terms of battery power, spectral efficiency and latency, since the SL positioning session may be interrupted by some or all of the anchor UEs.

For example, the SL positioning session may be interrupted, when resource utilization conflicts (e.g., collisions, half-duplex, discontinuous reception, DRX, restrictions) occur at either end of the positioning system (i.e., at the target or anchor UE) and the positioning link needs to be suspended.

As another example, the SL positioning session may be interrupted, when an anchor UE needs to down-prioritize an already accepted SL positioning session. This may happen, when the anchor UE is receiving a request for a higher priority traffic, such as URLLC, other UL/DL data traffic, etc. In other words, the down-prioritization of the SL positioning session may mean that the anchor UE prioritizes other traffic over the SL positioning session.

When either of the above events occurs, the anchor UE may excessively delay (such that it is outside the delay budget for positioning) and/or abandon the SL positioning session. Hence, the target UE may need to reconfigure the SL positioning session, potentially multiple times, at the expense of its own computational overhead and subsequent increased latency.

Instead of burdening the target UE with multiple SL positioning session reconfigurations, some example embodiments may provide a framework, through which the affected anchor UE hands over its SL positioning session to another available anchor UE, without interrupting the SL positioning session with the target UE. Some example embodiments may enable an ongoing SL positioning session to be finalized (in a transparent way for the target UE), even though one or more anchor UEs are unable to complete the SL positioning session (e.g., are down-prioritizing and/or leaving the ongoing session). Some example embodiments may utilize a set of signaling exchanges aimed at performing a soft handover of the anchor responsibilities from the current anchor UE to another anchor UE, without the target UE having to reconfigure the SL positioning session. Some example embodiments may reduce signaling overhead and computational overhead of the target UE, as well as help to keep latency below an acceptable threshold.

Figure 5:
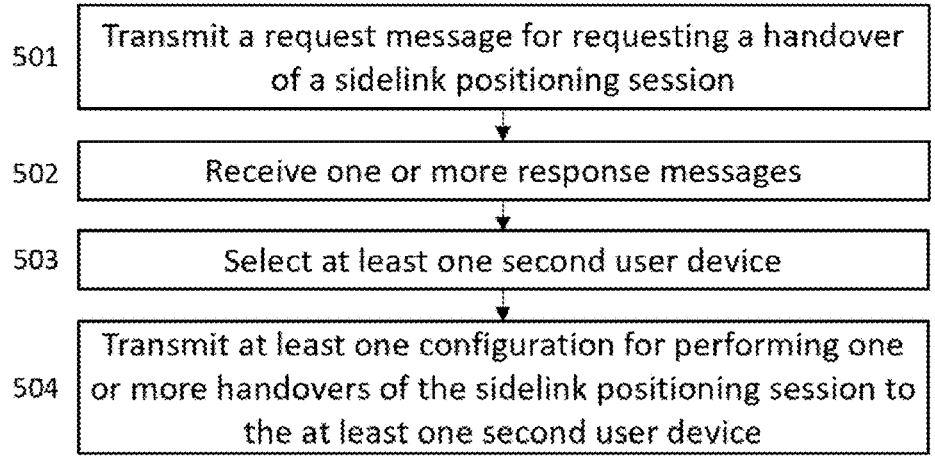
FIG. 5 illustrates a flow chart according to an example embodiment.

FIG. 5 illustrates a flow chart according to an example embodiment of a method performed by an apparatus such as, or comprising, or comprised in, a user device. The user device may also be called a primary anchor, third user device, subscriber unit, mobile station, remote terminal, access terminal, user terminal, terminal device, or user equipment (UE). For example, the user device may correspond to the user device 100 of FIG. 1.

Referring to FIG. 5, in block 501, a request message for requesting a handover of a sidelink positioning session established between the apparatus and a first user device is transmitted to one or more second user devices. For example, the request message may comprise at least one of: a sidelink positioning reference signal configuration of the apparatus, a list of second user devices targeted for the handover, an identifier of the sidelink positioning session, and/or one or more requirements for the sidelink positioning session.

Herein the handover of the sidelink positioning session refers to the session reconfiguration as seen from the viewpoint of the apparatus. The sidelink positioning session from the viewpoint of the apparatus may comprise maintaining one positioning link towards the first user device (whereas the positioning session from the viewpoint of the first user device may comprise maintaining positioning links with multiple anchors).

In block 502, one or more response messages are received from the one or more second user devices in response to transmitting the request message. For example, the one or more response messages may indicate at least one of: an availability in time and/or frequency for taking over the sidelink positioning session, a duration for being able to participate in the sidelink positioning session, and/or the identifier of the sidelink positioning session.

In block 503, at least one second user device of the one or more second user devices is selected.

For example, the at least one second user device may be selected based on at least one of: a distance between the apparatus and the at least one second user device, a transmitter capability of the at least one second user device, an availability of the at least one second user device, a likelihood of line-of-sight between the at least one second user device and the first user device, and/or an expected radio link budget between the at least one second user device and the first user device.

As another example, the at least one second user device may be selected based at least partly on one or more indications received from the first user device, the one or more indications indicating one or more preferred second user devices and/or one or more non-preferred second user devices among the one or more second user devices.

In block 504, at least one configuration is transmitted to the at least one second user device for performing one or more handovers of the sidelink positioning session for the first user device from the apparatus to the at least one second user device. For example, the at least one configuration may indicate at least one or more time and/or frequency domain locations for transmitting one or more sidelink positioning reference signals from the at least one second user device for participating in the sidelink positioning session.

Figure 6:
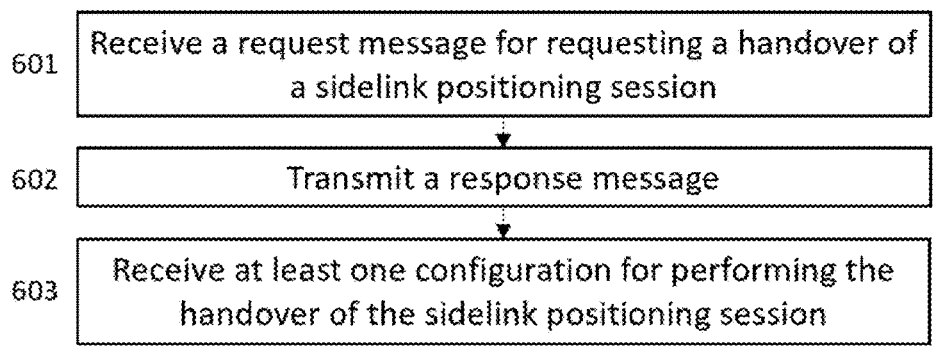
FIG. 6 illustrates a flow chart according to an example embodiment.

FIG. 6 illustrates a flow chart according to an example embodiment of a method performed by an apparatus such as, or comprising, or comprised in, a user device. The user device may also be called a standby anchor, second user device, subscriber unit, mobile station, remote terminal, access terminal, user terminal, terminal device, or user equipment (UE). For example, the user device may correspond to the user device 102 of FIG. 1.

Referring to FIG. 6, in block 601, a request message is received from a third user device for requesting a handover of a sidelink positioning session established between the third user device and a first user device. For example, the request message may comprise at least one of: a sidelink positioning reference signal configuration of the third user device, a list of second user devices targeted for the handover, an identifier of the sidelink positioning session, and/or one or more requirements for the sidelink positioning session, wherein the list of second user devices comprises at least the apparatus.

In block 602, a response message is transmitted to the third user device in response to receiving the request message. For example, the response message may indicate at least one of: an availability in time and/or frequency for taking over the sidelink positioning session, a duration for being able to participate in the sidelink positioning session, and/or the identifier of the sidelink positioning session.

In block 603, in response to transmitting the response message, at least one configuration is received from the third user device for performing the handover of the sidelink positioning session for the first user device from the third user device to the apparatus. For example, the at least one configuration may indicate at least one or more time and/or frequency domain locations for transmitting one or more sidelink positioning reference signals from the apparatus for participating in the sidelink positioning session.

Figure 7:
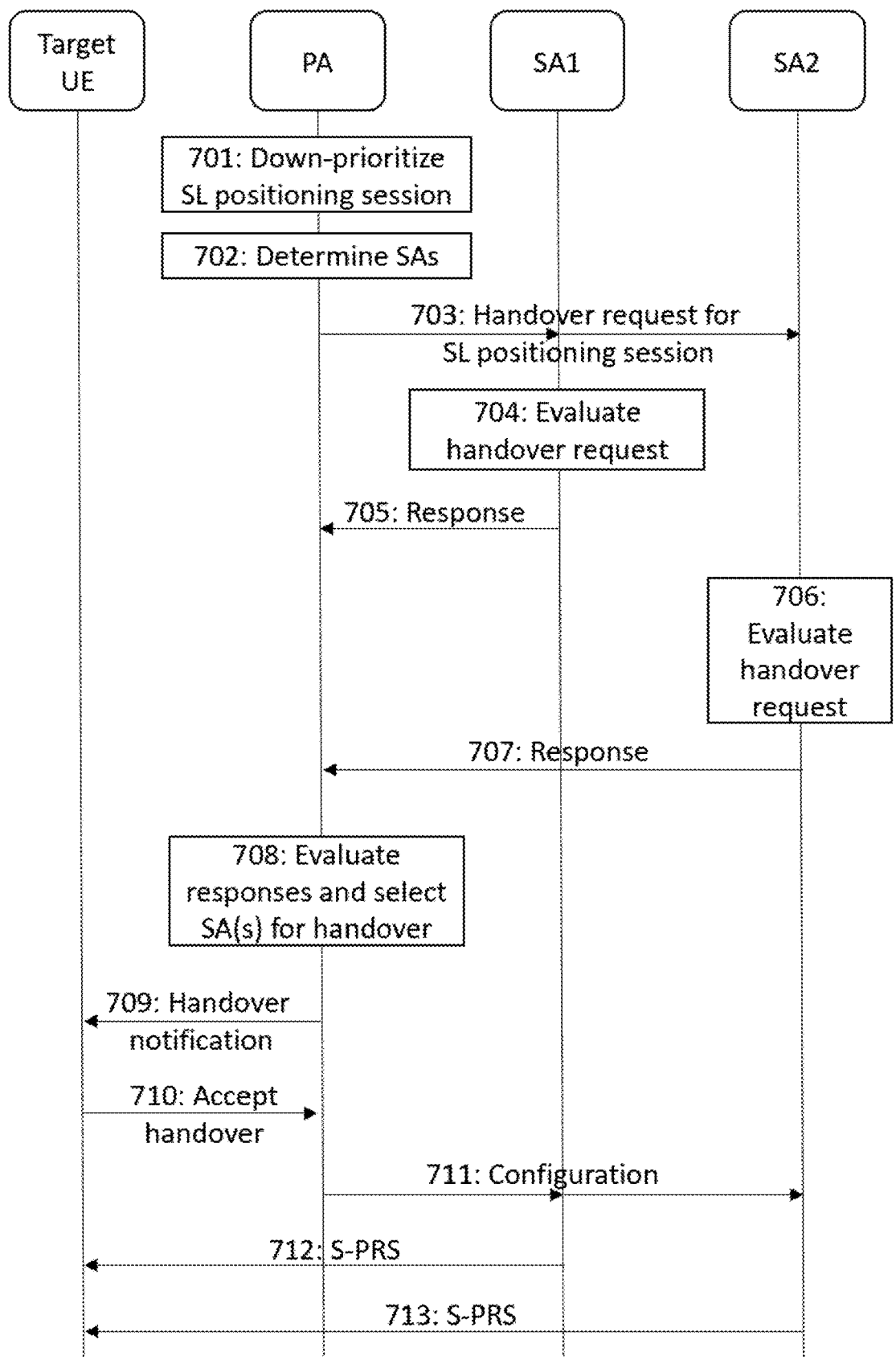
FIG. 7 illustrates a signaling diagram according to an example embodiment.

FIG. 7 illustrates a signaling diagram according to an example embodiment. Herein a target UE may have selected a set of primary anchor (PA) UEs and configured their respective S-PRS transmissions. The target UE may also have selected a set of standby anchor (SA) UEs, which a given PA UE may contact for a future handover of the SL positioning session. For example, the sets of PA UEs and SA UEs may be indicated in a groupcast message to the involved entities. A given PA UE may select one or more of the SA UEs indicated in the message for handing over the SL positioning session to.

Referring to FIG. 7, in step 701, a PA determines to down-prioritize the sidelink positioning session established between the PA and the target UE. For example, the PA may determine that the down-prioritization introduces an unacceptable latency, i.e., postponing the S-PRS transmission would yield an overall positioning latency larger than the accepted value. Alternatively, the PA may determine that it is unable to continue or complete the sidelink positioning session, and thus the PA may decide to leave the ongoing sidelink positioning session with the target UE. As a result, the PA may trigger a handover of the sidelink positioning session to one or more SAs.

Herein the handover of the sidelink positioning session refers to the session reconfiguration as seen from the viewpoint of the PA. The sidelink positioning session from the PA's viewpoint may comprise maintaining one positioning link towards the target UE (whereas the positioning session from target UE's viewpoint may comprise maintaining positioning links with multiple anchors).

Herein the target UE may also be referred to as a first user device, the SAs may also be referred to as SA UEs or second user devices, and the PA may also be referred to as a PA UE or third user device.

In step 702, the PA may determine, or select, a set of SAs as possible candidates for the handover.

For example, the set of SAs may be determined based on a pre-defined list indicated by the target UE. The target UE may provide the PA with a list of SAs that the PA may contact, if the PA decides to hand over the sidelink positioning session. For example, if some UE was considered as a candidate anchor UE, but was not chosen as a PA for example due to high collinearity (which may result in high geometric dilution of precision, GDOP) with an already selected PA, the target UE may indicate this UE as an SA to the PA. This may ensure uninterrupted (continuous) high-accuracy positioning at the target UE, if the PA hands over the SL positioning session to such an SA.

Alternatively, the PA may autonomously select one or more UEs for determining the set of SAs (i.e., without requiring an explicit indication from the target UE) based at least on a distance-based criterion and/or an availability-based criterion.

The distance-based criterion means that the PA may select a UE as an SA based on the distance between the PA and that UE. For example, the PA may select a UE that is in close proximity to the PA. Handing over the SL positioning session to an SA in close proximity to the PA may ensure fulfilling the requirement regarding the non-collinearity of PAs at the target UE for high-precision positioning. For example, the PA may use a zone identifier indicated in SCI(s), and/or reference signal received power (RSRP) measurements associated with transmissions (e.g., previous transmissions) originating from the UE to determine whether or not to select this particular UE as an SA.

The availability-based criterion means that the PA may select a UE as an SA based on the availability of the UE. For example, the availability may mean that the UE has indicated in at least one if its previous transmissions a capability to serve as an anchor UE. The capability may be indicated, for example, via a flag in the SCI. The flag may refer to a binary value of a bit in the SCI.

The set of SAs may comprise one or more SAs. For example, the set of SAs may comprise at least a first SA (SA1) and a second SA (SA2). Although two SAs are used as an example herein, it should be noted that the number of SAs may also be different than two. In addition, the signaling procedure illustrated in FIG. 7 may be extended and applied according to the actual number of SAs.

In step 703, in response to determining to down-prioritize the sidelink positioning session, or in response to determining an inability to continue or complete the sidelink positioning session, the PA transmits a handover request message for requesting a handover of the sidelink positioning session established between the PA and the target UE. For example, the handover request message may be broadcasted, or groupcasted to the set of SAs, or unicasted per SA of the set of SAs. For example, the handover request message may be detected, or received, by at least the first SA and the second SA. The handover request message may also be referred to as an H0 message herein.

The handover request message may trigger the handover of the sidelink positioning session from the PA to one or more SAs. The handover request message may comprise information about the ongoing sidelink positioning session as seen by the PA. For example, the handover request message may comprise at least one of: the S-PRS configuration of the PA, a list of SAs that are targeted for the handover, an identifier of the sidelink positioning session (which may be assigned by the target UE or higher layer), and/or one or more requirements for the sidelink positioning session.

The S-PRS configuration may indicate, for example, the S-PRS repetition rate and periodicity of the PA.

The list of SAs may comprise one or more preferred SAs for taking over the sidelink positioning session. The one or more preferred SAs may be selected based on past sidelink interactions between the PA and the one or more preferred SAs. For example, the PA may know which SA(s) are likely to detect the handover request message due to being in close proximity to the PA. Alternatively, or additionally, the list of SAs may be generated using a past H4 message that the PA has detected as a result of another sidelink positioning session handover (i.e., either initiated by itself in the past, or by another PA for another target UE).

The one or more requirements may comprise, for example, at least one of: a minimum and/or maximum threshold for periodicity and bandwidth of S-PRS transmission, a level of positioning accuracy (i.e., maximum uncertainty), UE capability requirements, and/or a remaining latency budget for the sidelink positioning session.

In step 704, the first SA evaluates the contents of the received handover request message.

In step 705, the first SA transmits, based on the evaluation of step 704, a response message to the PA to accept, modify or reject the handover request. The response message comprises the reply generated by the first SA in response to the handover request message from the PA. The response message may also be referred to as an H1 message herein.

The response message may comprise at least one of: the target availability in time, frequency and/or code for taking over the sidelink positioning session by the first SA, a duration for being able to participate in the sidelink positioning session by the first SA, and/or the identifier of the sidelink positioning session (this identifier may match the identifier that may be comprised in the handover request message).

For example, the first SA may indicate in the response message that all or some or none of the physical resource blocks (PRBs) used by the PA can be used by the first SA to transmit S-PRS.

As another example, the response message may comprise information about how soon the first SA can take over the sidelink positioning session. For example, the response message may comprise a subframe index indicating the earliest moment in time when the first SA is able to perform the S-PRS transmission.

As another example, the response message may indicate for how long the first SA is able to participate in the handed over sidelink positioning session.

Alternatively, the response message may comprise a rejection of the handover request. In this case, the rejection may be indicated for example by a rejection flag (e.g., a binary value of a bit). A rejection may be issued, if the SA is involved in sidelink communication, or in another sidelink positioning session, or due to other constraints for example associated with power saving.

In step 706, the second SA evaluates the contents of the received handover request message.

In step 707, the second SA transmits, based on the evaluation of step 706, a response message to the PA to accept, modify or reject the handover request. The response message may comprise at least one of: the target availability in time, frequency and/or code for taking over the sidelink positioning session by the second SA, a duration for being able to participate in the sidelink positioning session by the second SA, and/or the identifier of the sidelink positioning session.

In step 708, the PA evaluates the received response messages and selects at least one SA as the next PA, or a plurality of SAs that may sequentially become the PA. In the latter case, the current PA may generate an ordered list of SAs and associated time intervals, when they are expected to be active in the sidelink positioning session. For example, the list may indicate that the first SA becomes the PA during a first time interval, and that the second SA becomes the PA during a second time interval following the first time interval. In other words, the second time interval may start when the first time interval ends.

Figure 8:
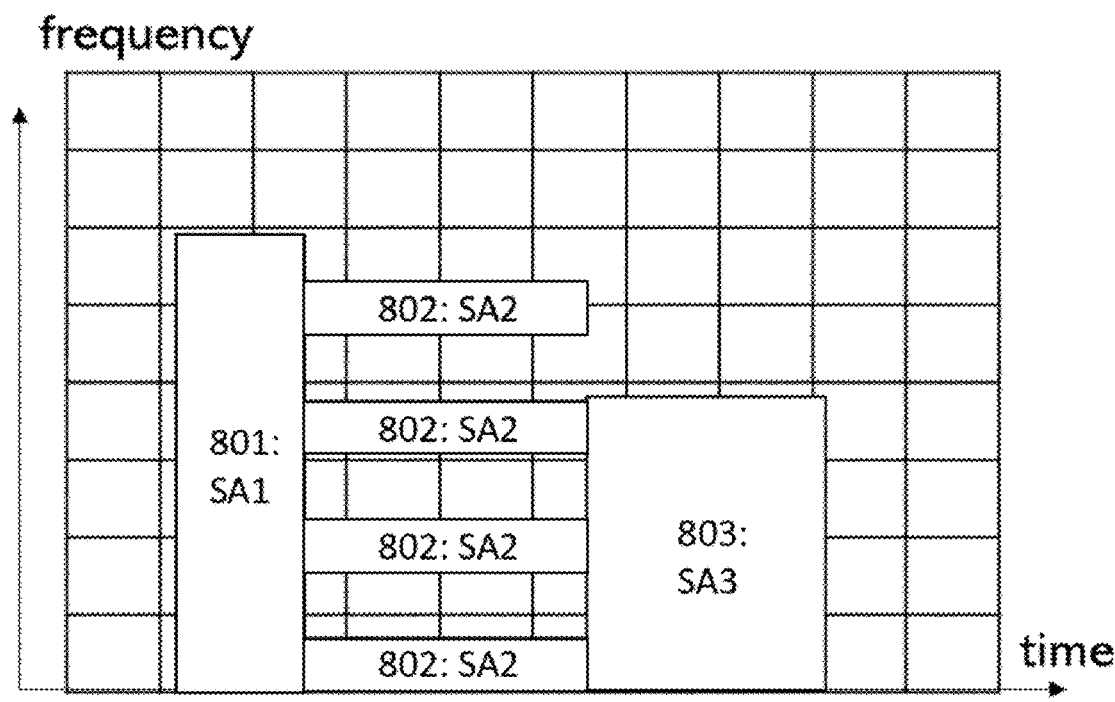
FIG. 8 illustrates an example of a sequence of handovers of a sidelink positioning session.

In other words, the PA may receive a response message from a plurality of SAs and, using the target UE's quality of service (QOS) requirements, generate a list of handover sequences among the plurality of responsive SAs. For example, the PA may select a plurality of SAs that will sequentially take over and then hand over the sidelink positioning session (e.g., as shown in FIG. 8).

A given SA may have a dedicated S-PRS configuration and support the sidelink positioning session for a specific amount of time. The selection and order of SA activation and deactivation may be done based on at least one of: a distance between the PA and the SA, a transmitter capability of the SA, an availability of the SA, a likelihood of line-of-sight between the SA and the target UE, and/or an expected radio link budget between the SA and target UE. The PA may determine the distance between the PA and the SA by measuring the received signal quality of the response message received from that SA. The transmitter capability may refer to, for example, the bandwidth, carrier, and/or transmission power budget of the SA. The availability of the SA may be indicated in the response message received from that SA.

It should be noted that the PA may schedule the sequence of handovers such that the sidelink positioning session is handed over back to itself at any time in the sequence of handovers, for example: [SA1, SA2, PA, SA3, . . . ].

Furthermore, the H1 response message broadcasted (or groupcasted with the target UE configured to be an intendent recipient) from the SAs may be configured with a corresponding hybrid automatic repeat request (HARQ)-like feedback resource to be monitored by the PA. Upon receiving the H1 response message, the target UE may indicate to the PA its preference on SAs by transmitting an acknowledgement (ACK) or a negative acknowledgement (NACK) in the corresponding HARQ-like feedback resource for preferred or non-preferred SA, respectively. In other words, the PA may select the SA(s) based at least partly on one or more indications received from the target UE, the one or more indications indicating one or more preferred SAs and/or one or more non-preferred SAs among the responsive SAs.

For example, when HARQ-like feedback for preference indication is configured, the target UE may send ACK and NACK in the feedback resources associated with the H1 response transmission from the first SA and the second SA, respectively, if the target UE prefers the first SA over the second SA. Here the target UE may make use of the identifier of the sidelink positioning session indicated in the H1 response message to determine whether or not a given SA is associated with its own sidelink positioning session.

Different sequences, or a combination of sequences, may be used to indicate the preference levels and/or non-preference levels.

In step 709, the PA transmits a notification message to the target UE for notifying or informing the target UE about the upcoming handover(s) of the sidelink positioning session established between the PA and the target UE. For example, the notification message may indicate one or more PRBs and/or one or more S-PRS codes to search for, when listening for incoming S-PRS transmissions from the next PA(s). The notification message may also be referred to as an H2 message herein. The one or more S-PRS codes refer to the set of parameters for generating the raw signal. For example, if the S-PRS is a Zadoff-Chu sequence, then the code may be defined by the length of the sequence and the root of the sequence.

In step 710, in response to receiving the notification message, the target UE may transmit a message to the PA to acknowledge, or accept, the handover. This acknowledgement may also be referred to as an H3 message herein. For example, the target UE may indicate the acknowledgement via a binary flag comprised in the H3 message. A HARQ-like feedback resource may be configured for the acknowledgement indication.

The H2 and H3 message pair may be used to conclude the handover. The target UE may also update the current anchor configuration, so that the positioning measurements acquired after the handover are correctly associated to an anchor identifier of the anchor taking over the sidelink positioning session, and to the position of that anchor.

In step 711, the PA transmits at least one configuration for performing one or more handovers of the sidelink positioning session from the PA to the selected SA(s). For example, the at least one configuration may be broadcasted or groupcasted to the selected SA(s). The at least one configuration may be transmitted in response to receiving the acknowledgement (H3 message) from the target UE.

The at least one configuration may be transmitted via a message referred to as H4 herein. The H4 message indicates the reconfiguration of the sidelink positioning session, i.e., the handover between the PA and the selected SA(s). In case the H4 message is broadcasted, the reconfiguration may also be used by another PA for a future handover of the sidelink positioning session, or by another target UE to configure its own sidelink positioning session.

The at least one configuration may comprise information needed for generating the raw signal for S-PRS. For example, the at least one configuration may indicate one or more S-PRS codes, one or more PRBs to be used for S-PRS transmission, and/or periodicity of the S-PRS transmission. In other words, the at least one configuration may indicate at least one or more time and/or frequency domain locations for transmitting one or more S-PRSs from the selected SA(s) for participating in the sidelink positioning session.

In step 712, the sidelink positioning session is handed over from the current PA to the next PA (e.g., to the first SA), and the next PA transmits, for example broadcasts, one or more sidelink positioning reference signals based on the at least one configuration received in the H4 message. The target UE may use the received S-PRS for positioning itself.

In step 713, the sidelink positioning session may be handed over to the next PA in the handover sequence (e.g., from the first SA to the second SA), and the next PA transmits, for example broadcasts, one or more sidelink positioning reference signals based on the at least one configuration received in the H4 message. The target UE may use the received S-PRS for positioning itself.

The steps and/or blocks described above by means of FIGS. 5-7 are in no absolute chronological order, and some of them may be performed simultaneously or in an order differing from the described one. Other steps and/or blocks may also be executed between them or within them, and other information may be transmitted and/or received. Some of the steps and/or blocks or a part of the steps and/or blocks may also be left out.

FIG. 8 illustrates an example, wherein a PA configures a sequence of multiple handovers of the sidelink positioning session established between the PA and a target UE. In this example, the SL positioning session is handed over to a first SA (SA1) at the time and frequency domain location represented by block 801. The SL positioning session is handed over from the first SA to a second SA (SA2) at the time and frequency domain locations represented by blocks 802. The SL positioning session is handed over from SA2 to a third SA (SA3) at the time and frequency domain location represented by block 803.

Figure 9:
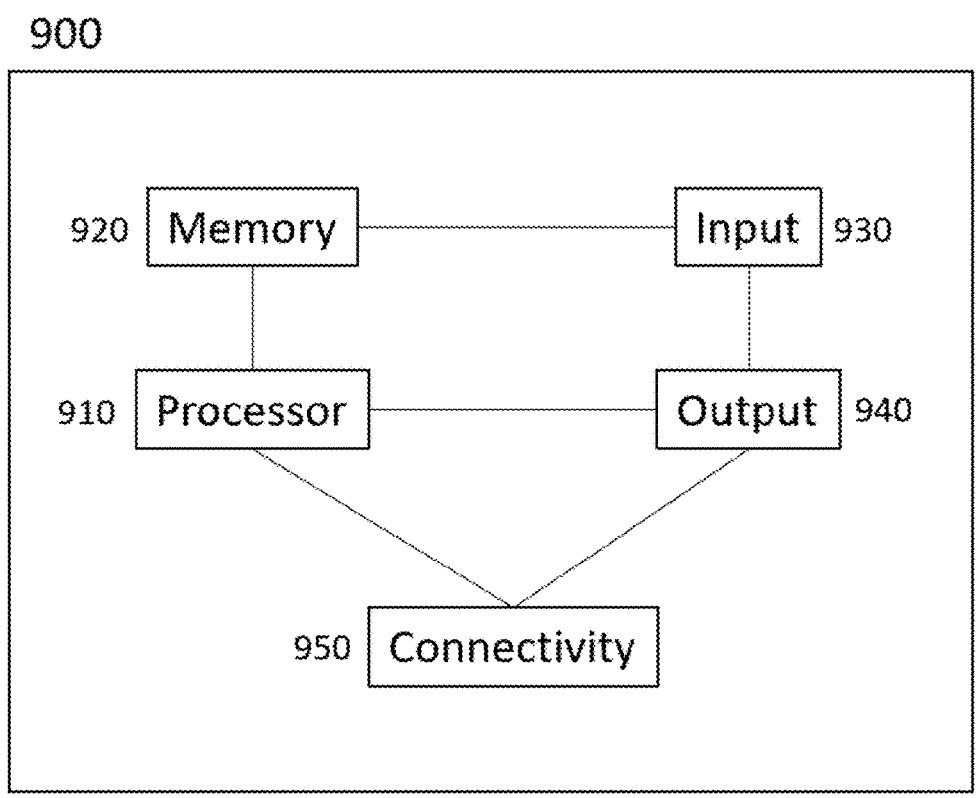
FIG. 9 illustrates an example embodiment of an apparatus.

FIG. 9 illustrates an example embodiment of an apparatus 900, which may be an apparatus such as, or comprising, or comprised in, a user device. The user device may also be called a first user device, second user device, third user device, anchor, positioning anchor, primary anchor, standby anchor, subscriber unit, mobile station, remote terminal, access terminal, user terminal, terminal device, or user equipment (UE). The user device may correspond to any of the user devices 100, 102 of FIG. 1.

The apparatus 900 comprises at least one processor 910. The at least one processor 910 interprets computer program instructions and processes data. The at least one processor 910 may comprise one or more programmable processors. The at least one processor 910 may comprise programmable hardware with embedded firmware and may, alternatively or additionally, comprise one or more application-specific integrated circuits (ASICs).

The at least one processor 910 is coupled to at least one memory 920. The at least one processor is configured to read and write data to and from the at least one memory 920. The at least one memory 920 may comprise one or more memory units. The memory units may be volatile or non-volatile. It is to be noted that in some example embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The at least one memory 920 stores computer readable instructions that are executed by the at least one processor 910 to perform one or more of the example embodiments described above. For example, non-volatile memory stores the computer readable instructions, and the at least one processor 910 executes the instructions using volatile memory for temporary storage of data and/or instructions.

The computer readable instructions may have been pre-stored to the at least one memory 920 or, alternatively or additionally, they may be received, by the apparatus, via an electromagnetic carrier signal and/or may be copied from a physical entity such as a computer program product. Execution of the computer readable instructions causes the apparatus 900 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 900 may further comprise, or be connected to, an input unit 930. The input unit 930 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 930 may comprise an interface to which external devices may connect to.

The apparatus 900 may also comprise an output unit 940. The output unit may comprise or be connected to one or more displays capable of rendering visual content, such as a light emitting diode (LED) display, a liquid crystal display (LCD) and/or a liquid crystal on silicon (LCoS) display. The output unit 940 may further comprise one or more audio outputs. The one or more audio outputs may be for example loudspeakers.

The apparatus 900 further comprises a connectivity unit 950. The connectivity unit 950 enables wireless connectivity to one or more external devices. The connectivity unit 950 comprises at least one transmitter and at least one receiver that may be integrated to the apparatus 900 or that the apparatus 900 may be connected to. The at least one transmitter comprises at least one transmission antenna, and the at least one receiver comprises at least one receiving antenna. The connectivity unit 950 may comprise an integrated circuit or a set of integrated circuits that provide the wireless communication capability for the apparatus 900. Alternatively, the wireless connectivity may be a hardwired application-specific integrated circuit (ASIC). The connectivity unit 950 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 900 may further comprise various components not illustrated in FIG. 9. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

LIST OF ABBREVIATIONS

4G: fourth generation
5G: new radio/fifth generation
6G: sixth generation
ACK: acknowledgement
ADC: analog-to-digital converter
AP: access point
ASIC: application-specific integrated circuit
BBU: baseband unit
CN: core network
CPS: cyber-physical system
CSSP: customer-specific standard product
CU: central unit
CU-CP: central unit control plane
CU-UP: central unit user plane
DAC: digital-to-analog converter
DFE: digital front end
DL: downlink
DL-AoD: downlink angle of departure
DL-TDoA: downlink time difference of arrival
DRAM: dynamic random-access memory
DSP: digital signal processor
DSPD: digital signal processing device
DU: distributed unit
EEPROM: electronically erasable programmable read-only memory
eNB: evolved NodeB/4G base station
FPGA: field programmable gate array
GEO: geostationary earth orbit
gNB: next generation NodeB/5G base station
GPU: graphics processing unit
HARQ: hybrid automatic repeat request
HNB-GW: home node B gateway
IAB: integrated access and backhaul
IMS: internet protocol multimedia subsystem
IoT: internet of things
L1: Layer 1
L2: Layer 2
L3: Layer 3
LBT: listen-before-talk
LCD: liquid crystal display
LCOS: liquid crystal on silicon
LCS: location server
LED: light emitting diode
LEO: low earth orbit
LTE: long term evolution
LTE-A: long term evolution advanced
M2M: machine-to-machine
MAC: medium access control
MANET: mobile ad-hod network
MEC: multi-access edge computing
MIMO: multiple input and multiple output
MME: mobility management entity
mMTC: massive machine-type communications
MT: mobile termination multi-RTT: multi-cell round trip time
NACK: negative acknowledgement
NFV: network function virtualization
NGC: next generation core
NR: new radio
PA: primary anchor
PCS: personal communications services
PDA: personal digital assistant
PDCP: packet data convergence protocol
P-GW: packet data network gateway
PHY: physical
PLD: programmable logic device
PRB: physical resource block
PROM: programmable read-only memory
PRS: positioning reference signal
PSCCH: physical sidelink control channel
PSFCH: physical sidelink feedback channel
PSSCH: physical sidelink shared channel
QoS: quality of service
RAM: random-access memory
RAN: radio access network
RAP: radio access point
RAT: radio access technology
RedCap: reduced capability
Rel: Release
RI: radio interface
RLC: radio link control
ROM: read-only memory
RRC: radio resource control
RRH: remote radio head
RSRP: reference signal received power
RSU: road-side unit
RU: radio unit
RX: receiver
SA: standby anchor
SCI: sidelink control information
SDAP: service data adaptation protocol
SDN: software defined networking
SDRAM: synchronous dynamic random-access memory
SDT: small data transmission
S-GW: serving gateway
SIM: subscriber identification module
SL: sidelink
SL-SR: sidelink scheduling request
SoC: system-on-a-chip
S-PRS: sidelink positioning reference signal
SRS: sounding reference signal
TRP: transmission and reception point
TRX: transceiver
TX: transmitter
UE: user equipment
UL: uplink
UL-AoA: uplink angle of arrival
UL-TDoA: uplink time difference of arrival
UMTS: universal mobile telecommunications system
UTRAN: UMTS radio access network
UWB: ultra-wideband
vCU: virtualized central unit
vDU: virtualized distributed unit
WCDMA: wideband code division multiple access
WiMAX: worldwide interoperability for microwave access
WLAN: wireless local area network

The invention claimed is:
1. An apparatus comprising at least one processor, and at least one memory including computer program code, wherein the at least one memory and the computer program code are configured, with the at least one processor, to cause the apparatus to:
   transmit, to one or more second user devices, a request message for requesting a handover of a sidelink positioning session established between the apparatus and a first user device,
      wherein the request message is transmitted in response to determining to down-prioritize the sidelink positioning session, or in response to determining an inability to complete the sidelink positioning session, and
      wherein the request message comprises a sidelink positioning reference signal configuration of the apparatus, a list of second user devices targeted for the handover, an identifier of the sidelink positioning session, and one or more requirements for the sidelink positioning session;
   receive, from the one or more second user devices, one or more response messages to the request message,
      wherein the one or more response messages indicate an availability in time and frequency for taking over the sidelink positioning session, a duration for being able to participate in the sidelink positioning session, and the identifier of the sidelink positioning session;
   select at least one second user device of the one or more second user devices,
      wherein the at least one second user device is selected based on: a distance between the apparatus and the at least one second user device, a transmitter capability of the at least one second user device, an availability of the at least one second user device, a likelihood of line-of-sight between the at least one second user device and the first user device, and an expected radio link budget between the at least one second user device and the first user device, and
      wherein the at least one second user device comprises a plurality of second user devices, and the one or more handovers comprise a sequence of handovers among the plurality of second user devices;
   transmit, to the first user device, a notification message for notifying the first user device about one or more handovers of the sidelink positioning session from the apparatus to the at least one second user device,
      wherein the notification message indicates one or more physical resource blocks and one or more sidelink positioning reference signal codes to search for from the at least one second user device;
   receive, from the first user device, in response to transmitting the notification message, an acknowledgement for the one or more handovers;
   transmit, to the at least one second user device, at least one configuration for performing the one or more handovers of the sidelink positioning session from the apparatus to the at least one second user device for the first user device in response to receiving the acknowledgement from the first user device,
      wherein the request message is transmitted to a set of second user devices based on a pre-defined list indicated by the first user device, the pre-defined list indicating the set of second user devices comprising at least the one or more second user devices, and
      wherein the at least one configuration indicates one or more time and frequency domain locations for transmitting one or more sidelink positioning reference signals from the at least one second user device for participating in the sidelink positioning session.

* * * * *